US005498658A

United States Patent [19]

Pourahmady et al.

[11] Patent Number: 5,498,658
[45] Date of Patent: Mar. 12, 1996

[54] FORMALDEHYDE-FREE LATEX FOR USE AS A BINDER OR COATING

[75] Inventors: Naser Pourahmady, Solon; Gary A. Anderle, North Olmsted; Alex S. Williamson, Brecksville, all of Ohio

[73] Assignee: The B. F. Goodrich Company, Akron, Ohio

[21] Appl. No.: 340,985

[22] Filed: Nov. 17, 1994

[51] Int. Cl.$^6$ ............................ C08L 33/14; C08L 31/06; C08L 33/24

[52] U.S. Cl. .................... 524/502; 524/537; 524/555; 524/565; 524/567; 524/577; 526/307.6; 526/307.7; 526/312; 526/318.25; 526/318.42; 526/318.5; 526/320; 526/323; 526/342; 526/344; 526/347

[58] Field of Search ................ 526/307.6, 318.25, 526/323; 427/389.9; 524/502, 555

[56] References Cited

U.S. PATENT DOCUMENTS

| | | |
|---|---|---|
| 3,919,451 | 11/1975 | Levy et al. . |
| 4,199,643 | 4/1980 | Falgiatore et al. . |
| 4,524,093 | 6/1985 | Devry ............................ 427/389.9 |
| 4,613,650 | 9/1986 | Sekiya et al. . |
| 5,021,529 | 6/1991 | Garrett . |
| 5,104,923 | 4/1992 | Steinwand et al. . |
| 5,198,492 | 3/1993 | Stack . |
| 5,278,222 | 1/1994 | Stack . |
| 5,334,648 | 8/1994 | Drews et al. . |

*Primary Examiner*—Fred Zitomer
*Attorney, Agent, or Firm*—George W. Moxon II

[57] ABSTRACT

A one-part, substantially formaldehyde-free, self-curing interpolymer comprising repeating units derived from a) about 4 to about 30 percent by weight of at least one functional monomer selected from olefinically unsaturated monomer containing a nucleophile group: b) about 4 to about 40 percent by weight of an olefinically unsaturated dicarboxylic acid; c) about 1 to about 60 percent by weight of (meth)acrylonitrile; d) about 0 to about 80 percent by weight of at least one monomer selected from the group consisting of (meth)acrylic acid ester of an alcohol containing 1 to 30 carbon atoms; and e) about 0 to about 80 percent by weight of at least one monomer selected from the group consisting of styrene, vinyl acetate, and vinyl halides, wherein at least one of monomers d) and e) are present in an amount of from about 0.1 percent by weight, for use as a fiber binder, such as for coating non-woven glass mats, or as a saturant for fiber substrates such as paper.

13 Claims, No Drawings

FORMALDEHYDE-FREE LATEX FOR USE AS A BINDER OR COATING

BACKGROUND OF THE INVENTION

This invention relates to a formaldehyde-free latex for use as a fiber binder, such as coating for non-woven mats, such as glass mats, or as a saturant or coating for fiber substrates, such as paper. The latex serves to bond the fibers when cured.

Latexes have been widely used as binder or saturants or coatings for non-woven substrates and paper. In paper substrates, the latex binder or saturant contributes to the high strength of the paper. In paper cloth products having a non-woven, randomly-oriented structure, the polymer latex serves as a binder to hold the structure together and provide strength. Examples of paper cloth products include high-strength, high absorbent materials such as disposable items, e.g., consumer and industrial wipes or towels, diapers, surgical packs and gowns, industrial work clothing and feminine hygiene products. Latex binders are also used for durable products, such as carpet and rug backings, apparel interlinings, automotive components and home furnishings, and for civil engineering materials, such as road underlays.

Non-woven substrates can be formed from fiberglass, polyester, rayon, carbon, and the like fibers. These non-woven substrates could be made by wet-laid processes or dry or air-laid processes. In each case, the latex serves to bind the fibers together and provide tensile strength, solvent resistance and/or high temperature strength to the substrate.

The strength and dimensional stability that is required of paper, non-woven and woven fabrics is currently achieved by bonding the fibers in place with a latex that is crosslinkable. The incorporation of functional or reactive monomers into the copolymer backbone allows the copolymer latex to undergo a crosslinking reaction on curing or processing. Many commercially available monomers contain formaldehyde as an impurity or will promote a crosslinking reaction that evolves formaldehyde. Alternatively, the crosslinking can be obtained by post-adding various aminoplasts to the latex polymer. These situations have frequently involved the use of condensates of melamine and formaldehyde or urea and formaldehyde, but, the presence or evolution of formaldehyde in latex binders is not desirable.

A number of patents have tried to eliminate or minimize formaldehyde use or formation in crosslinking. For example, U.S. Pat. No. 4,524,093 to W.E. Devry teaches a fabric coating composition with low formaldehyde evolution in which an aqueous emulsion of alkyl acrylate monomers are copolymerized with acrylonitrile, itaconic acid, and N-methylol acrylamide. The latex binder substantially reduces the evolution of formaldehyde. U.S. Pat. No. 5,021,529 to R.Y. Garrett teaches a formaldehyde-free, self-curing interpolymer. The polymer is derived from an ethylenically unsaturated monomer, a N-alkylol amide of an alpha, beta-ethylenically unsaturated carboxylic acid and itaconic acid. U.S. Pat. Nos. 5,198,492 and 5,278,222 to D.P. Stack teaches a latex binder for cellulose which is especially useful where low formaldehyde emitting applications are involved. The binder is a combination of a non-formaldehyde emitting latex admixed with an aqueous copolymer dispersion of a highly functionalized emulsion copolymer. The functionalized emulsion copolymer taught is a low solids. i.e., 10 to 16% by weight of solids emulsion, made from 10 to 60 phm of an olefinically unsaturated non-ionic organic compound and equal parts of a carboxylic acid and an olefinically unsaturated carboxylic acid hydroxy ester or an olefinically unsaturated amide or mixtures thereof. The need to blend materials to make a useful latex binder puts limits on its usefulness, may limit blendablility and miscibility, and raises low shelf life issues.

SUMMARY OF THE INVENTION

The present invention is to a one-part, substantially formaldehyde-free, self-curing interpolymer derived from a functional polymer, which can be an olefinically unsaturated monomer containing a nucleophile group; an olefinically unsaturated dicarboxylic acid; an acrylonitrile; and additional monomers which will produce a polymer having a high or low $T_g$ or glass transition temperature. It was discovered that the resulting polymer can have a $T_g$ of between about $-10°$ and $120°$ C. and yet produce a binder useful for paper and non-woven fibers, including glass, polyester, rayon, carbon, cellulose, blends thereof and the like or as a binder or a saturant for fibrous substrates, such as paper. It does not have to be added to or be combined with an additional latex polymer to be a binder. The resulting binder has high dry and wet tensile strengths, high solvent tensile strength, high hot tensile strength, and good aged color.

DETAILED DESCRIPTION OF THE INVENTION

The present invention is to a binder for paper and non-woven substrates, including paper, glass, polyester, rayon, carbon, cellulose, or blends of fibers. It is a one-pan binder which can be used alone to bind the fibers in a woven or non-woven substrate. The substantially formaldehyde-free, self-curing interpolymer is derived from the following monomers:

(a) at least one functional monomer, which is an olefinically unsaturated monomer containing a nucleophile group, (b) an olefinically unsaturated dicarboxylic acid monomer, (c) (meth)acrylonitrile, (d) optionally, a monomer producing a relatively low $T_g$, such as a (meth)acrylic acid ester of an alcohol containing I to 30 carbon atoms, and (e) optionally, a monomer producing a relatively high $T_g$, such as a monomer selected from styrene, vinyl acetate, and vinyl halides, with at least one of the high $T_g$ or low $T_g$ monomers being present.

The functional monomer is an olefinically unsaturated monomer containing a nucleophile group. The functional monomer has a functionality which in combination with a dicarboxylic acid will allow the polymer to self-crosslink and is present in an amount of from about 4 to about 30% by weight of the polymer, or phr. The nucleophile monomer could be a hydroxy alkyl (meth)acrylate or an acrylamide, or an amino alkyl (meth)acrylate. The alkyl group would have between about 2 and 4 carbon atoms.

The functional monomer is represented by the following formula:

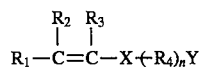

where $R_1$, $R_2$ and $R_3$ are hydrogen or a methyl group, $R_4$ is an alkyl containing 1 to 4 carbon atoms, n is 0 or 1, X is selected from the group consisting of carboxyl, phenyl, aryl, alkyl or alkaryl groups containing 1 to 30 atoms, and Y is a nucleophilic group selected from —NH$_2$

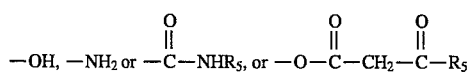

$$-OH, -NH_2 \text{ or } -\overset{O}{\underset{\|}{C}}-NHR_5, \text{ or } -O-\overset{O}{\underset{\|}{C}}-CH_2-\overset{O}{\underset{\|}{C}}-R_5$$

wherein $R_5$ is a hydrogen, an alkyl containing 1–20 carbon atoms, or an aryl group. The latter is an enol forming group, such as an acetoacetoxy or the like.

The olefinically unsaturated dicarboxylic acid is present in an amount of between about 4 and 40 phr. Dicarboxylic acids that could be employed include itaconic acid, citraconic acid, maleic acid, and fumaric acid, with itaconic acid being preferred. Variation in the polymerization process may be necessary to employ dicarboxylic acids other than, e.g., maleic acid, citraconic acid or itaconic acid, such as by using a solution polymerization process instead of an emulsion polymerization process.

The acrylonitrile or methacrylonitrile is present in an amount of between 1 and 60 parts per hundred resin/monomer or phr.

The interpolymer will have a $T_g$ of between about $-10°$ and $120°$ C. The precise requirements for the $T_g$ will vary depending on the use of the polymer, such as for use as a glass binder or as a paper saturant. This variation can be achieved by the inclusion of one or more monomers which will result in a polymer having a relatively low or high $T_g$. For example, the addition of (meth)acrylic acid ester can produce a polymer which has a relatively low $T_g$, while the addition of a monomer such as styrene, or other styrenic monomer, such as alpha methyl styrene, vinyl acetate, or vinyl halide can produce a polymer which has a relatively high $T_g$. For convenience, a monomer which produces a polymer having a relatively low $T_g$, e.g., equal to or below about 25° C., will be referred to as a low $T_g$ monomer, while a monomer which produces a polymer having relatively high $T_g$, e.g., above about 25° C. will be referred to as a high $T_g$ monomer. By varying the ratios of the monomers a latex polymer having a $T_g$ appropriate for its use as a binder can be produced. The (meth)acrylic acid ester can be present in an amount of from 0 to 80 parts per hundred resin, monomer or phr, preferably 1 to 80. and can be an ester of an alcohol containing 1 to 30 carbon atoms. It is a (meth) acrylate monomer having no reactive functionality. Examples of acrylate monomers include methyl (meth)acrylate, ethyl (meth)acrylate, lauryl (meth)acrylate, n-butyl (meth)acrylate, and 2-ethylhexyl (meth)acrylate, with ethyl acrylate and n-butyl acrylate being preferred. The high $T_g$ monomer will be present in an amount of 0 to 60 parts per hundred resin/monomer, preferably 1 to 60 phr.

The interpolymers of the present invention can be made by emulsion, dispersion, or suspension polymerization or by solution polymerization utilizing polar and/or non-polar solvents. The preferred method is an emulsion polymerization method to give an interpolymer latex. This process is generally conducted in the presence of water, an emulsifier, and an initiator, as well as other such polymerization aids. The process typically produces a latex containing more than 20% by weight solids, preferably more than 30% by weight solids, which is usable per se as a binder without having to be combined with other latex polymers. The precise amount of solids will depend upon the monomers chosen as well as the polymerization steps and other ingredients.

When emulsifiers are used to prepare the latexes of this invention, the usual types of anionic and nonionic emulsifiers may be employed. Suitable anionic emulsifiers include alkali metal or ammonium salts of the sulfates of alcohols containing 8 to 18 carbon atoms such as sodium lauryl sulfate, alkali metal and ammonium salts or sulfonated petroleum and paraffin oils, sodium salts or sulfonic acids, alkylaryl sulfonates, alkali metal and ammonium salts of sulfonated dicarboxylic acid esters, and the like. Nonionic emulsifiers such as octyl or nonylphenyl polyethoxyethanol can also be used. Latexes of excellent stability can be prepared with emulsifiers selected from alkali metal and ammonium salts of aromatic sulfonic acids, alkyl and alkylarl sulfonates, alkyl sulfates, and alkyl or arylalkyl poly-(oxyalkylene) sulfonates.

The amount of emulsifiers can vary between about 0.0 to 5 parts by weight per 100 parts by weight of the monomers, and excellent results can be obtained with 0.0 to 1 part of emulsifiers. The latexes described herein are more preferably prepared using very low to moderate levels of emulsifiers in the range of 0.01 to 0.5 dry parts per 100 parts of monomers.

The polymerization of the latex monomers disclosed herein can be conducted at temperatures of about 5° C. to about 95° C. typically about 30° to about 85° C., in the presence of a compound capable of initiating polymerization. Commonly used free radical initiators include the various peroxides, t-butyl hydroperoxide, and cumene hydroperoxide; and azo compounds such as azodiisobutyronitrile and dimethylazodiisobutyrate. Particularly useful initiators are the water-soluble peroxygen compounds such as hydrogen peroxide and the sodium, potassium and ammonium persulfates used by themselves or in an activated redox system. Typical redox systems include alkali metal persulfates in combination with a reducing substance such as polyhydroxyphenols and oxidizable sulfur compounds, a reducing sugar, dimethylaminopropionitrile, and a water-soluble ferrous compound. Polymer latexes with excellent stability can be obtained using alkali metal and ammonium persulfate initiators. The amount of initiator used will generally be in the range of 0.01 to 3% by weight, based on the weight of the monomers, preferably between 0.2 and 2%. The initiator can be charged at the outset of the polymerization, however, incremental addition of the initiator throughout polymerization can also be employed and is often advantageous.

Typical polymerization for the preparation of the acrylic ester latexes described herein is conducted by charging the reactor with appropriate amount of water, emulsifier and electrolyte, if any is employed, and the full amount of the initiator to be used in the polymerization. The amount of initiator used is about ten times the amount used in a typical latex polymerization, for which the typical amount is 0.2 to 0.25 parts per 100 parts of monomer. Any conventional emulsifier can be employed, although Abex-JKB emulsifier (30% solids), an anionic surfactant commercially available from Rhone-Poulenc Company is preferred. The reactor is then evacuated, heated to the initiation temperature, and the monomer and emulsifier are proportioned over several hours. The rate of proportioning is varied depending on the polymerization temperature, the particular initiator employed and the amount of the monomer(s) being polymerized. The rate of polymerization can be controlled by metering in additional initiator solution. After all the components have been charged, the reaction is run for a length of time necessary to achieve the desired conversion. The pH of the latex is in the range of about 2 to about 10.

The latexes described herein can be compounded with, or have mixed therein, other known ingredients such as emulsifiers, curing agents, fillers, plasticizers, antioxidants or stabilizers, antifoaming agents, dying adjuvants, pigments, or other compounding aids. Furthermore, thickeners or bodying agents may be added to the polymer latexes so as to control the viscosity of the latexes and thereby achieve the proper flow properties for the particular application desired.

Specifically, the latexes described herein are suitable for use as binders for natural materials and for blends of natural materials with synthetics. The materials referred to herein include, in particular, paper made by bonding cellulosic fibers with the latex binder of this invention; nonwoven fabrics made by bonding natural, synthetic, or a mixture of such fibers with the binder of this invention: and woven fabrics treated with a latex binder. A variety of fibers could be bonded including glass, polyester, rayon, carbon, cellulose, or mixtures thereof. These fibers can be woven in to a fabric or could be a non-woven web made by a wet laid or dry laid process. Further, the binder/saturant could be added to the fibers after formation of the paper or non-woven web, or to the fiber slurry in a beater addition process.

Among the wide variety of applications that can be listed for the latex binders described herein, many of these products require a desirable degree of water resistance, as indicated by their wet strength, but at the same time must maintain a level of water permeability so as to permit transport of body fluids, such as perspiration and urine, through the coverstock into the underlying absorptive pad. Another application could be as a corduroy backcoating wherein the latex is applied to the back side of a formed corduroy fabric for pile retention, dimensional stability, strength, and good hand.

Latexes of the present invention can be applied to the substrate in any suitable fashion as by spraying, dipping, roll-transfer, brushing, or the like. Application of the latexes to the fibers is preferably made at room temperature to facilitate cleaning of the associated apparatus. The non-volatile solids concentration of the latexes can be in the range of 5 percent to 70 percent by weight, and preferably from 5 percent to 25 percent when applied by dipping. When applied by roll-transfer, solids concentration of the latexes is generally about 40–50 percent whereas with the spraying technique, the range is wider.

The proportion of a latex polymer that is applied to the web or mat is enough to provide 10 to 100 percent, preferably 25 to 40 percent by weight of the polymer, based on the total weight of the polymer and fibers. After application of the latex to the fibrous web, the impregnated or saturated web is dried either at room temperature or at elevated temperature. The web is subjected, either after completion of the drying or as the final step of the drying stage itself, to a baking or curing operation which may be effected at a temperature of about 100° C. to about 400° C. for a period which may range from about one-half hour at the lower temperatures to as low as a fraction of a second at the upper temperature. The conditions of baking and curing are controlled so that no appreciable deterioration or degradation of the fibers or polymer occurs. Preferably, the curing is effected at a temperature of 120° C. to 226° C. for a period of 0.5 to 10 minutes.

The following examples are presented for the purpose of illustrating the invention disclosed herein in greater detail. The examples are not, however, to be construed to limiting the invention herein in any manner, the scope of the invention which is defined by the appended claims.

Example 1

An interpolymer was prepared from the following ingredients:

TABLE 1

| Ingredient | Amount Parts per hundred parts monomer |
| --- | --- |
| Deionized Water | 168.10 |
| Itaconic Acid | 9.50 |
| Acrylamide | 13.00 |
| Styrene | 30.00 |
| Acrylonitrile | 35.00 |
| Ethyl Acrylate | 12.50 |
| Ammonium Hydroxide (28%) | 0.60 |
| Emulsifier | 0.82 |
| 3-Mercaptopropionic Acid | 0.20 |

In a 2-liter glass vessel equipped with a mechanical stirrer, recipe amount (Table 1) of itaconic acid, acrylamide, styrene, acrylonitrile, and ethyl acrylate, were pre-emulsified in 45 parts (360 grams) of deionized water, containing 0.5 part (28% solution) of ammonium hydroxide and 0.8 part (30% solution) of an emulsifier, Abex-JKB. The resulting emulsion was then proportioned at a rate of 12–13 grams per minute, into a preheated (80° C.) 3-liter glass reactor, containing deionized water (105 parts, 840 grams). ammonium hydroxide (0.1 part, 28% solution), Abex-JKB (0.02 part, 30% solution), and ammonium persulfate (2.5 parts, 20 grams). Concurrently, a solution of sodium bisulfite (0.25 part, 2 grams) in deionized water (9.4 parts, 75.2 grams) was also metered into the reactor through a separate stream at the rate of 0.4 gram per minute. At the end of monomer proportioning, a mixture of water (8.7 parts, 69.6 grams), styrene (0.75 part, 6 grams) and 3-mercapto-propionic acid (0.2 part, 1.6 grams) was added to the reactor. The heating (80° C.) continued for an additional 2 hours. The emulsion was then cooled down filtered through a cheese-cloth. The resulting copolymer latex contained 34.5% total solid polymer (as tested by a Lab-Wave 9000 microwave oven from CEM Inc.), with average particle size of 197 nm (Brookhaven BI-90 particle size analyzer). The final pH of the emulsion was 4.05 with Brookfield viscosity was 6.0 centipoise at room temperature. The $T_g$ of the polymer was 95.6° C.

Example 2

An interpolymer was prepared from the following ingredients:

TABLE 2

| Ingredient | Amount Parts per hundred parts monomer |
| --- | --- |
| Deionized Water | 168.10 |
| Itaconic Acid | 8.50 |
| Hydroxypropyl Acrylate | 8.00 |
| Styrene | 35.50 |
| Acrylonitrile | 39.00 |
| n-Butyl Acrylate | 9.00 |
| Ammonium Hydroxide (28%) | 0.70 |
| Emulsifier | 0.52 |
| 3-Mercaptopropionic Acid | 0.20 |

The procedure outlined in Example 1 was used with the following changes, n-Butyl acrylate and hydroxypropyl acrylate were used instead of ethyl acrylate and acrylamide (the recipe quantities are given in Table 2). A portion of itaconic acid (4 parts) was added to the reactor at the beginning, while the rest of its (4.5 parts) was pre-emulsified along with the other monomers. The ammonium hydroxide level was increased from 0.6 part to 0.7 part. The amount of emulsifier in pre-emulsified mixture was reduced from 0.87 to 0.5 part. The polymerization was carried out in a 5-liter reactor.

The resulting emulsion contained 34.59% solid polymer, average particle size 250 nm, and Brookfield viscosity of 8 cps. The $T_g$ of the polymer was 89.5.

Example 3

An interpolymer was prepared from the following ingredients:

TABLE 3

| Ingredient | Amount (phr) |
|---|---|
| Deionized Water | 173.70 |
| Itaconic Acid | 6.50 |
| 2-Hydroxyethyl Acrylate | 6.00 |
| Styrene | 37.50 |
| Acrylonitrile | 40.00 |
| Ethyl Acrylate | 10.00 |
| Ammonium Hydroxide (28%) | 0.60 |
| 3-Mercaptopropionic Acid | 0.20 |

This is an example of emulsifier-free process used for the preparation of the copolymers of the invention. A mixture of the recipe amounts of monomers (Table 3 was proportioned at a rate of 8.5 grams per minute, into a preheated (80° C.) 3-liter glass reactor, containing deionized water (140 parts, 1120 grams), ammonium hydroxide (0.25 part, 28% solution), and ammonium persulfate (2.5 parts, 20 grams). Concurrently, a solution of itaconic acid (4.5 parts, 36 grams), sodium bisulfite (0.25 part, 2 grams), ammonium hydroxide (28% solution, 0.35 part), and deionized water (25 part, 2 grams), ammonium hydroxide (28% solution, 0.35 part), and deionized water (25 pans, 200 grams) was also metered into the reactor through a separate stream at the rate of 1.4 grams per minute. At the end of monomer proportioning, a mixture of water (8.7 parts, 69.6 grams), styrene 10.75 part, 6 grams), and 3-mercapto-propionic acid (0.2 part, 1.6 grams) was added to the reactor. The heating (80° C.) continued for an additional 2 hours. The emulsion was then cooled down, filtered through a cheesecloth, and tested. Total solid polymer was 34.2, with an average particle size of 220 nm and Brookfield viscosity of 9.0 cps. The $T_g$ of the polymer was 96.7.

In order to understand the value of the polymer, examples of applications of the polymer to paper and nonwoven substrates were evaluated according to the following test methods.

Test Methods

Paper Saturation:

In order for the latex polymer to be evaluated as a paper saturant or binder, a paper sheet bound with the latex was prepared. The base paper is dipped in the emulsion bath so that the paper becomes completely saturated with the given emulsion. The paper is then removed from the bath, and run through a lab scale size press, which consists of two rolls that contact each other at a given pressure (typically 10–20 psi). As the paper is rolled through the press, excess resin is removed from the paper. The amount of polymer left in the sheet is controlled by the total solids of the emulsion bath, the roll pressure of the press, and the speed with which the paper moves through the size press.

After the paper is saturated with the emulsion, it is dried on a steam can for 1–2 minutes. The steam can is a contact heater (98° C.), and serves only to flash-off the water found in the paper as a result of the saturation process. The amount of polymer added to the sheet (stated as % pick-up) is typically determined after this step. The percent pick-up is the final weight of the sheet less the initial weight of the sheet divided by the initial weight of the sheet times 100.

The paper is tested after steam-can drying and curing for 3 to 5 minutes at 300° F.

Wet-Laid Glass Mat:

To test the latex as a binder for nonwoven webs, such as glass fiber sheets, a bonded nonwoven web is formed. A glass fiber sheet is made by dispersing glass fibers in water and then depositing those fibers on a screen. The sheet is then dipped into an emulsion bath. The excess polymer is removed by means of a vacuum slot. The amount of polymer added to the sheet is controlled by the total solids of the bath, and the amount of vacuum applied to the sheet. The sheet is then dried and cured in an automatic hot air circulating oven, such as a Mathis oven, typically for 2 minutes at 200° C. The amount of polymer added to the fiber sheet (stated as % LOI) is determined after this step. The present LOI or loss on ignition is the final weight of the sheet less the initial weight of the sheet divided by the final weight of the sheet times 100.

The following tests were performed on the paper sheets and glass mats to evaluate their physical properties and the properties of the binder.

A. Dry Tensile Test:

A 1 inch by 6 inch sample was tested in an Instron or Thwing-Albert tensile apparatus at a crosshead speed of 12 inches per minute. The jaw gap was 4 inches. Paper sheets results are based upon an average of 4 tests, while glass mats results are based upon an average of 9 tests. The dry tensile strength is reported in pounds per inch. The highest value achieved is preferable. Tensile strengths are determined in both the machine direction (MD) and the cross direction, but for the purposes of this application only the MD tensile strengths are being presented. The cross direction tensile strengths would provide similar information.

B. Wet Tensile Test:

The same sample and test procedure is used as with the dry tensile test, except that the paper samples are soaked in 1% typical surfactant solution for 20 minutes before testing and the glass mat samples are soaked in 82° C. water for 10 minutes before testing. The wet tensile strength is reported in pounds per inch, and a high value is desirable. The wet tensile retention percentage is also reported, which is the wet tensile strength divided by the dry tensile strength times 100.

C. Hot Tensile Test:

The same samples and test procedures are followed as with the wet tensile test, except that the samples are placed in a hot box at 375° F. for 3 minutes before testing. The hot tensile strength is reported in pounds per inch. A high value is desirable. The hot tensile retention percentage which is reported is the hot tensile strength divided by the dry tensile strength times 100.

D. Perchloroethylene Tensile Test:

The same samples and test procedures are followed as with the dry tensile test except the paper samples are soaked in perchloroethylene for 20 minutes before testing. The perchloroethylene tensile strength is reported as pounds per inch. A high value is desirable. The perchloroethylene tensile retention percentage is the perchloroethylene tensile strength divided by the dry tensile strength times 100.

E. Mullen Burst Test:

For paper, an average of 4 tests is reported based upon TAPPI test procedure T-403 om-85. The results from the Mullen burst test are reported in pounds per square inch or psi.

F. Glass Transition Temperature ($T_g$)

The glass transition temperatures of the polymers were measured on a Mettler DSC-30 differential scanning calorimeter.

The number of polymers, in addition to Examples 1–3 were prepared in accordance with the process set forth in Example 1 and these were evaluated in paper and glass substrates in accordance with the tests described above. Some of the same polymers were tested on both paper fibers and glass fibers, while other polymers were tested on paper only or glass only. For example, Examples Nos. 1 and 2 were tested on both paper and glass, while Example No. 3 was tested on glass only. So, the same example numbers have been used for the same polymer. These results are reported in Tables IV and V, and the following abbreviations are used for the monomers:

ACN=acrylonitrile
STY=styrene
IA=itaconic acid
CA=citraconic acid
EA=ethyl acrylate
nBA=n-butyl acrylate
EHA=2-ethyl hexyl acrylate
ACM=acrylamide
HEA=hydroxyethyl acrylate
HPA=hydroxy propyl acrylate As can be seen from Tables IV and V, when latex polymers in accordance with the present invention are compared with commercially available latex polymers containing formaldehyde, such as HYCAR 26447 polymer and HYCAR 26138 polymer commercially available from BFGoodrich, and RHOPLEX GL 618 polymer commercially available from Rohm and Haas, as well as combinations of these commercial polymers with additional melamine- or urea-formaldehyde cross linking agents, such as Cymel −303 resin, which is a commercially available from Cytec Corporation, methoxymethyl melamine, formaldehyde-emitting, cross-linking agent,

TABLE IV

Paper Saturation Test Results

| Example No. | Functional Monomer | Polymer (phr) Dicarboxylic Acid | ACN | Low $T_g$ Monomer | High $T_g$ Monomer | $T_g$ | Total Solids (% by wt) | % Pickup | MD Dry Tensile (lb/inch) | MD Wet Tensile Strength (lb/inch) | Retention (%) | MD Perchlor Tensile Strength (lb/inch) | Retention (%) | Mullen (psi) |
|---|---|---|---|---|---|---|---|---|---|---|---|---|---|---|
| 1 | 1300 ACM | 9.50 IA | 35.00 | 12.50 EA | 30.00 STY | 95.6 | 34.50 | 19.6 | 28.5 | 9.50 | 33.3 | 22.4 | 78.6 | 28.9 |
| 2 | 8 HPA | 8.5 IA | 39.0 | 9.00 nBA | 35.50 STY | 89.5 | 34.59 | 19.0 | 26.2 | 11.89 | 45.4 | 24.4 | 93.1 | 31.1 |
| 4 | 6.00 ACM | 6.50 IA | 40.00 | 12.00 EA | 35.50 STY | 96.1 | 34.55 | 21.0 | 27.9 | 10.71 | 38.4 | 25.9 | 92.8 | 30.8 |
| 5 | HYCAR 26497 | | | | | 25.0 | 48.0 | 20.3 | 24.9 | 9.23 | 37.1 | 16.7 | 67.1 | 39.2 |
| 6 | HYCAR 26447 | | | | | 54.0 | 46.0 | 21.4 | 29.6 | 12.40 | 41.9 | 18.3 | 61.8 | 39.7 |
| 7 | HYCAR 26447 + 5 phr Cymel 303 | | | | | | | 20.0 | 31.4 | 15.82 | 50.4 | 20.8 | 66.2 | 39.6 |
| 11 | 13.00 ACM | 9.50 IA | 32.00 | 21.50 EA | 24.00 STY | 80.9 | 34.55 | 18.9 | 29.9 | 12.49 | 41.8 | 29.1 | 97.3 | 37.0 |
| 12 | 13.00 ACM | 9.50 IA | 27.50 | 30.00 EA | 20.00 STY | 67.8 | 34.19 | 19.2 | 28.2 | 11.68 | 41.4 | 27.9 | 98.9 | 30.9 |
| 13 | 6.00 HEA | 4.50 IA | 41.00 | 11.00 EA | 37.50 STY | 92.8 | 37.92 | 19.6 | 25.4 | 9.34 | 36.8 | 20.1 | 79.1 | 27.6 |
| 14 | 4.00 HEA | 6.50 IA | 41.00 | 11.00 EA | 37.50 STY | 94.6 | 38.39 | 20.2 | 25.7 | 11.56 | 45.0 | 22.0 | 85.6 | 31.0 |
| 16 | 5.0 ACM 5.0 HEA | 8.5 IA | 34.0 | 12.0 EA | 35.5 STY | 86.9 | 35.90 | 19.6 | 28.1 | 11.75 | 41.8 | 26.4 | 94.0 | 29.9 |
| 17 | 5.0 ACM 5.0 HEA | 8.5 IA | 34.0 | 12.0 nBA | 35.5 STY | 78.6 | 36.39 | 19.2 | 29.3 | 11.92 | 40.7 | 20.4 | 69.6 | 35.0 |
| 18 | — | 9.5 IA | 22.5 | 38.0 EA | 30.0 STY | 52.7 | 34.35 | 21.4 | 28.4 | 11.63 | 41.0 | 18.4 | 64.8 | 32.0 |
| 19 | — | 20.0 IA | 25.0 | 40.0 EA | 15.0 STY | 48.0 | 34.53 | 18.7 | 28.8 | 13.85 | 48.1 | 21.7 | 75.3 | 34.4 |
| 20 | — | 9.5 IA | 35.5 | 25.0 EA | 30.0 STY | 72.5 | 34.59 | 19.0 | 27.5 | 12.37 | 45.0 | 22.1 | 80.4 | 32.6 |
| 21 | 5.0 HEA | 6.0 IA | 23.0 | 66.0 nBA | — | −5.0 | 37.50 | 20 | 23.5 | 11.5 | 48.9 | 13.9 | 59.1 | N/I |
| 22 | 50 HEA | 6.0 IA | 27.0 | 45.0 nBA | 16.0 STY | 30.0 | 37.60 | 20 | 36.4 | 18.6 | 51.1 | 21.5 | 59.1 | N/I |
| 23 | 5.0 ACM | — | 36.0 | 19.0 nBA | 40.0 STY | 72.9 | 34.80 | 22.0 | 27.3 | 5.46 | 20.0 | 21.5 | 78.8 | 32.8 |
| 24 | 5.0 HEA | — | 36.0 | 19.0 nBA | 40.0 STY | 69.9 | 34.70 | 22.0 | 26.7 | 5.50 | 20.1 | 18.7 | 70.0 | 29.0 |

TABLE IV-continued

Paper Saturation Test Results

| | Polymer (phr) | | | | | | | | MD | | | | |
|---|---|---|---|---|---|---|---|---|---|---|---|---|---|
| | | | | | | | Total | | | Wet Tensile | | Perchlor Tensile | | |
| Example No. | Functional Monomer | Dicarboxylic Acid | ACN | Low $T_g$ Monomer | High $T_g$ Monomer | $T_g$ | Solids (% by wt) | % Pick-up | MD Dry Tensile (lb/inch) | Strength (lb/inch) | Retention (%) | Strength (lb/inch) | Retention (%) | Mullen (psi) |
| 25 | 5.0 HEA | — | — | 10.0 EA | 78.5 STY | 83.5 | 38.10 | 20.0 | 20.9 | 6.94 | 33.2 | 7.1 | 34.0 | 22.1 |
| 26 | 5.0 HEA | — | 31.0 | 11.0 EA | 48.0 STY | 97.9 | 35.70 | | 19.7 | 6.75 | 34.3 | 2.13 | 10.8 | 28.0 |

TABLE V

Nonwoven Glass Mat Results

| | Polymer (phr) | | | | | | Total | | | MD Wet Tensile | | Hot Tensile | |
|---|---|---|---|---|---|---|---|---|---|---|---|---|---|
| Example No. | Functional Monomer | Dicarboxylic Acid | ACN | Low $T_g$ Monomer | High $T_g$ Monomer | $T_g$ (°C.) | Solids (% by wt) | IOI (%) | Dry Tensile (lb/inch) | Strength (lb/inch) | Retention (%) | Strength (lb/inch) | Retention (%) |
| 1 | 13.00 ACM | 9.50 IA | 35.00 | 12.50 EA | 30.00 STY | 95.6 | 34.50 | 22.5 | 27.8 | 11.06 | 39.8 | 6.30 | 22.7 |
| 2 | 8 HPA | 8.5 IA | 39.0 | 9.00 nBA | 35.50 STY | 89.5 | 34.59 | 21.9 | 43.6 | 21.5 | 49.3 | 9.2 | 21.1 |
| 3 | 6.00 HEA | 6.50 IA | 40.00 | 10.00 EA | 37.50 STY | 96.7 | 34.19 | 22.5 | 23.8 | 11.76 | 49.4 | 6.65 | 27.9 |
| 4 | 6.00 ACM | 6.50 IA | 40.00 | 12.00 EA | 35.50 STY | 96.1 | 34.55 | 22.5 | 21.2 | 9.06 | 42.7 | 4.58 | 21.6 |
| 5 | HYCAR 26497 | | | | | 25.0 | 48 | 21.5 | 30.5 | 4.8 | 15.7 | 1.5 | 4.9 |
| 8 | HYCAR 26138 | | | | | 25.0 | 50.0 | 22.5 | 29.0 | 5.80 | 20.0 | 6.3 | 21.7 |
| 9 | HYCAR 26138 + 5 phr U-F | | | | | | | 22.5 | 27.6 | 7.43 | 26.9 | 6.6 | 23.9 |
| 10 | Rhoplex GL 618 | | | | | 30.0 | 48 | 22.0 | 40.9 | 12.1 | 29.6 | 2.7 | 6.7 |
| 13 | 6.00 HEA | 4.50 IA | 41.00 | 11.00 EA | 37.50 STY | 92.8 | 37.92 | 22.5 | 34.1 | 20.5 | 60.1 | 10.3 | 30.2 |
| 14 | 4.00 HEA | 6.50 IA | 41.00 | 11.00 EA | 37.50 STY | 94.3 | 38.39 | 22.5 | 31.0 | 19.3 | 62.3 | 12.1 | 39.0 |
| 15 | 6.00 HEA | 6.50 IA | 45.00 | 2.50 EA | 40.00 STY | 111.0 | 37.60 | 22.5 | 32.7 | 18.6 | 56.9 | 14.6 | 44.6 |
| 16 | 5 ACM 5 HEA | 8.5 IA | 34.0 | 12.0 EA | 35.5 STY | 86.9 | 35.90 | 21.8 | 41.9 | 24.6 | 58.7 | 10.5 | 25.1 |
| 17 | 5.0 ACM 5.0 HEA | 8.5 IA | 34.0 | 12.0 nBA | 35.5 STY | 78.6 | 36.39 | 21.8 | 41.8 | 19.4 | 46.4 | 12.1 | 28.9 |
| 18 | — | 9.5 IA | 22.5 | 38.0 EA | 30.0 STY | 52.7 | 34.35 | 22.1 | 43.5 | 17.9 | 41.1 | 1.7 | 3.9 |
| 19 | — | 20.0 IA | 25.0 | 40.0 EA | 15.0 STY | 48.0 | 34.53 | 22.4 | 44.0 | 21.5 | 48.9 | 4.5 | 10.2 |
| 20 | — | 9.5 IA | 35.5 | 25.0 IA | 30.0 STY | 72.0 | 34.59 | 21.7 | 41.0 | 16.4 | 40.0 | 3.3 | 8.0 |
| 21 | 5.0 HEA | 6.0 IA | 23.0 | 66.0 nBA | — | −5.0 | 37.50 | 22.1 | 27.0 | 5.7 | 21.1 | 8.1 | 30.0 |
| 22 | 5.0 HEA | 6.0 IA | 27.0 | 46.0 nBA | 16.0 STY | 30.0 | 37.60 | 22.1 | 40.9 | 10.8 | 26.4 | 7.0 | 17.1 |
| 23 | 5.0 ACM | — | 36.0 | 19.0 nBA | 40.0 STY | 72.9 | 34.80 | 21.6 | 40.7 | 13.7 | 33.7 | 2.0 | 4.9 |
| 24 | 5.0 HEA | — | 36.0 | 19.0 nBA | 40.0 STY | 69.4 | 34.70 | 21.3 | 42.8 | 20.5 | 47.9 | 4.0 | 9.1 |
| 25 | 5.0 HEA | 6.5 IA | — | 10.0 EA | 78.5 STY | 83.5 | 38.10 | 22.2 | 41.5 | 26.8 | 64.6 | 4.9 | 11.8 |
| 26 | 5.0 HEA | 5.0 CA | 31.0 | 11.0 EA | 48.0 STY | 97.9 | 35.70 | 21.6 | 44.9 | 26.0 | 57.9 | 4.8 | 10.7 |
| 27 | — | 9.50 IA | 39.50 | 11.00 nBA | 40.00 STY | 87.1 | 35.24 | 22 | 22.7 | 6.65 | 29.3 | 3.7 | 16.3 |
| 28 | 13.00 ACM | 6.50 IA | 37.50 | 13.00 EA | 30.00 STY | 96.6 | 35.58 | 22 | 26.8 | 9.33 | 34.8 | 6.1 | 22.8 |
| 29 | 5.0 HEA | 5.5 IA | 35.0 | 11.0 EA | 43.5 STY | 98.4 | 38.40 | 22.1 | 45.1 | 33.0 | 73.2 | 6.8 | 15.1 | the polymers perform equally and/or better and have good wet and hot retention percentage values. This can be contrasted with a polymer such as Hycar 26497 polymer, which is commercially available from BFGoodrich, which is a non-formaldehyde containing latex polymer, which shows the polymers of the present invention to be superior in MD perchloroethylene tensile strength in paper mats and wet tensile and hot tensile strength in glass mats.

Further from the results set forth in Tables IV and V, the combination of a functional monomer and a dicarboxylic acid produces an excellent balance of properties in the polymers of the present invention. For example, Examples 18, 19 and 20 which contain no functional monomer produced a dramatic decrease in hot tensile strength in glass mats and wet tensile strength in paper mats compared to Examples 13 and 14 which a polymers in accordance with the present invention. The data shows that a variety of dicarboxylic acids can be used, that the hydroxy esters perform equally to the amides, that the use of both is not necessary to achieve performance polymers, and that a variety of polymers of varying $T_g$ can be made having acceptable performance.

The foregoing embodiments of the present invention have been presented for purposes of illustration and description.

These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. A formaldehyde-free, self-curing interpolymer comprising repeating units derived from
   a) about 4 to about 30 percent by weight of at least one functional monomer comprising an olefinically unsaturated monomer containing a nucleophile group represented by the following formula:

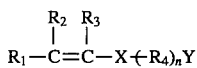

where $R_1$, $R_2$ and $R_3$ are hydrogen or a methyl group, $R_4$ is an alkyl containing 1 to 4 carbon atoms, n is 0 or 1, X is selected from the group consisting of carboxyl, phenyl, aryl, alkyl or alkaryl groups containing 1 to 30 atoms, and Y is a nucleophilic group selected from $-NH_2$

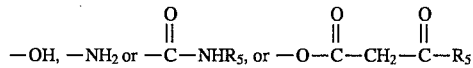

wherein $R_5$ is selected from the group consisting of a hydrogen, an alkyl containing 1–20 carbon atoms, or an aryl group;
   b) about 4 to about 40 percent by weight of an olefinically unsaturated dicarboxylic acid;
   c) about 1 to about 60 percent by weight of (meth)acrylonitrile;
   d) about 0 to about 80 percent by weight of at least one monomer comprising a (meth)acrylic acid ester of an alcohol containing 1 to 30 carbon atoms; and
   e) about 0 to about 80 percent by weight of at least one monomer selected from the group consisting of styrene, vinyl acetate, and vinyl halides, wherein at least one of the monomers d) or e) are present in an amount of from about 0.1 percent by weight.

2. The interpolymer of claim 1 wherein the interpolymer has a Tg of between about $-10°$ and $120°$ C.

3. The interpolymer of claim 1 wherein tile interpolymer has a $T_g$ of about $50°$ to $120°$ C.

4. The interpolymer of claim 1 wherein the interpolymer has a $T_g$ of about $80°$ to $120°$ C.

5. The interpolymer of claim 1 wherein the interpolymer has a $T_g$ of about $50°$ to $90°$ C.

6. The interpolymer of claim 1 wherein the interpolymer has a $T_g$ of about $-5°$ to $30°$ C.

7. The interpolymer of claim 1 wherein the nucleophile group is selected from the group consisting of hydroxy esters and amides.

8. The interpolymer of claim 1 wherein said dicarboxylic acid is selected from the group consisting of itaconic acid, citraconic acid, maleic acid, and fumaric acid.

9. The interpolymer of claim 1 wherein said dicarboxylic acid is itaconic acid.

10. The interpolymer of claim 1 wherein said (meth)acrylic acid ester is selected from the group consisting of ethyl acrylate, n-butyl acrylate, 2-ethylhexyl acrylate, and mixtures thereof.

11. A latex comprising the interpolymer of claim 1.

12. The latex of claim 11 having a solids content of more than 20% by weight.

13. The latex of claim 11 having a solids content of more than 30% by weight.

* * * * *